(12) United States Patent
Kim et al.

(10) Patent No.: US 7,204,895 B2
(45) Date of Patent: Apr. 17, 2007

(54) ELECTROPOLYMERIZATION METHOD FOR PREPARING NANO-TUBE TYPE CONDUCTING POLYMER USING POROUS TEMPLATE, METHOD FOR PREPARING ELECTROCHROMIC DEVICE, AND ELECTROCHROMIC DEVICE PREPARED THEREFROM

(75) Inventors: Sang-Ho Kim, Daejeon (KR); Won-Jong Kwon, Daejeon (KR); Sun-Ah Park, Seoul (KR); Shin-Jung Choi, Busan (KR); Yun-Il Hwang, Daejeon (KR); Sang-Bok Lee, Seoul (KR)

(73) Assignee: LG Chem, Ltd. (KR)

( * ) Notice: Subject to any disclaimer, the term of this patent is extended or adjusted under 35 U.S.C. 154(b) by 166 days.

(21) Appl. No.: 10/482,322

(22) PCT Filed: Apr. 15, 2003

(86) PCT No.: PCT/KR03/00764

§ 371 (c)(1),
(2), (4) Date: Dec. 29, 2003

(87) PCT Pub. No.: WO03/089982

PCT Pub. Date: Oct. 30, 2003

(65) Prior Publication Data

US 2005/0040048 A1    Feb. 24, 2005

(51) Int. Cl.
*B31B 1/60* (2006.01)
*G02F 1/15* (2006.01)
*C25B 3/00* (2006.01)

(52) U.S. Cl. .................. 156/1; 205/414; 205/419; 359/265; 359/900

(58) Field of Classification Search ............... 205/414, 205/419; 359/265, 900; 156/1
See application file for complete search history.

(56) References Cited

U.S. PATENT DOCUMENTS 4,785,380 A * 11/1988 Harakawa et al. .......... 361/527

(Continued)

FOREIGN PATENT DOCUMENTS

JP      03126922 A  *  5/1991

(Continued)

OTHER PUBLICATIONS

PCT Internation Search Report; International application No. PCT/KR03/00764; International filing date: Apr. 15, 2003; Date of Mailing: Aug. 21, 2003.

(Continued)

*Primary Examiner*—Edna Wong
(74) *Attorney, Agent, or Firm*—Cantor Colburn LLP

(57) ABSTRACT

The present invention relates to an electropolymerization method for preparing a nanotube-type conducting polymer using a porous template, a method for preparing an electrochomic device using electrochromism of the conducting polymer, and an electrochromic device prepared therefrom, and more particularly to an electropolymerization method for preparing a nanotube-type conducting polymer using a porous template to prepare an electrochromic device having good electrochromism by injecting an electrolyte solution wherein a precursor of the electrochromic conducting polymer is dissolved into an electrochemical reaction cell comprising a first transparent electrode and a working electrode, which is a porous template on the electrode, a method for preparing an electrochromic device using electrochromism of the conducting polymer, and an electrochromic device prepared therefrom.

6 Claims, 2 Drawing Sheets

U.S. PATENT DOCUMENTS

| | | | |
|---|---|---|---|
| 4,886,572 A * | 12/1989 | Kimura et al. | 216/6 |
| 5,549,807 A | 8/1996 | Bell et al. | 205/50 |
| 6,067,184 A | 5/2000 | Bonhote et al. | 359/265 |
| 6,278,231 B1 * | 8/2001 | Iwasaki et al. | 313/310 |
| 2001/0021534 A1 | 9/2001 | Wohlstadter et al. | |
| 2003/0077515 A1 | 4/2003 | Chen et al. | |

FOREIGN PATENT DOCUMENTS

| | | |
|---|---|---|
| KR | 2000-0038843 | 7/2000 |
| KR | 2001-0107273 | 12/2001 |
| WO | WO 92/22687 | 12/1992 |

OTHER PUBLICATIONS

Supplemental European Search Report for Application No. 03746899.8, 2 pages. Aug. 22, 2006.

Udo Bach et al., Nanomaterials-Based Electrochromics for Paper-Quality Displays, Advanced Materials 2002, 14, No. 11, Jun. 5, 845-848.

* cited by examiner

ELECTROPOLYMERIZATION METHOD FOR PREPARING NANO-TUBE TYPE CONDUCTING POLYMER USING POROUS TEMPLATE, METHOD FOR PREPARING ELECTROCHROMIC DEVICE, AND ELECTROCHROMIC DEVICE PREPARED THEREFROM

BACKGROUND OF THE INVENTION (a) Field of the Invention

The present invention relates to an electropolymerization method for preparing a nanotube-type conducting polymer using a porous template, a method for preparing an electrochromic device using electrochromism of the conducting polymer, and an electrochromic device prepared therefrom, and more particularly to an electropolymerization method for preparing a nanotube-type conducting polymer using a porous template to prepare an electrochromic device having good electrochromism by increasing the surface area of the conducting polymer, a method for preparing an electrochromic device using electrochromism of the conducting polymer, and an electrochromic device prepared therefrom.

(b) Description of the Related Art

With the recent rapid development in electronic devices and the spread of networks, a huge amount of information is being shared. In this regard, the transfer medium of such information is trending from conventional paper to electronic devices. However, the conventional display devices do not show information as conveniently as that printed on paper. In addition, with the extensive spread of mobile devices, including notebook computers and mobile phones, consumption of electric power by display devices is emerging as a problem.

To overcome these problems, development of a paperlike display, a low power consuming reflection-type display device having superior visibility, is in progress. As a prospective candidate for a paper-like display device, the electrochromism is gaining interest.

The electrochromism changes color of a material by an electrochemical reaction. It offers visibility comparable to that of printed paper, and requires a very low driving voltage. However, the electrochromism method has problems to be solved, such as slow coloration and bleaching, latent images after bleaching, and so on. Recently, there have been many efforts to overcome these problems, and an epoch-making invention for solving the problems by increasing the surface area of an electrode by forming the electrode with an inorganic nanocrystal (U.S. Pat. No. 6,067,184) has been made.

However, this method still has some problems. First, it has problems in pixelation, and it also requires a very high temperature for forming the electrode.

SUMMARY OF THE INVENTION

An object of the present invention is to provide an electropolymerization method for preparing a nanotube-type conducting polymer using a porous template to prepare an electrochromic device having superior electrochromic properties by increasing the surface area of the conducting polymer.

Another object of the present invention is to provide a method for preparing an electrochromic device using electrochromism of the nanotube-type conducting polymer.

Still another object of the present invention is to provide an electrochromic device prepared by the method.

To attain the objects, the present invention provides an electropolymerization method of a nanotube-type conducting polymer, which comprises a step of forming an electrochemical reaction cell comprising a first transparent working electrode on which a porous template is located, and a step of electropolymerization of nanotube-type conducting polymer from the precursor of the conducting polymer in an electrolyte solution using the porous template in the electrochemical reaction cell.

The present invention also provides a method for preparing an electrochromic device, which is composed of a first plane, which is comprising a nanotube-type conducting polymer and a first transparent electrode, a second plane comprising a second transparent electrode, and an electrolyte solution between these two planes.

The present invention also provides an electrochromic device prepared by the method.

DETAILED DESCRIPTION OF THE PREFERRED EMBODIMENTS

Figure 1:
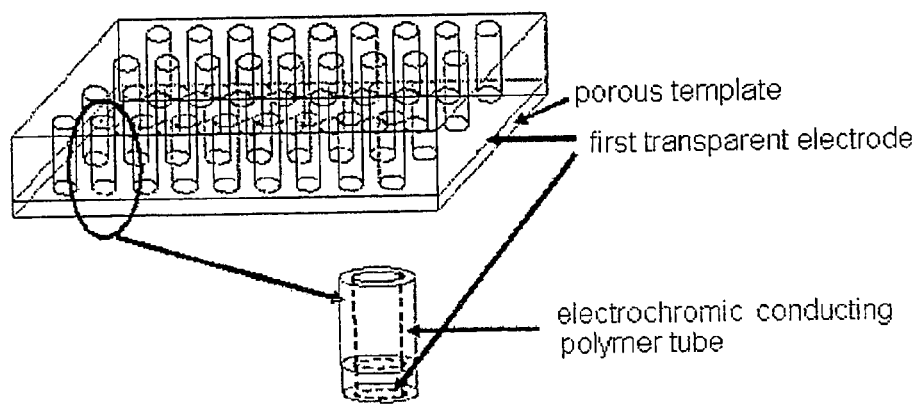
FIG. 1 is an enlarged perspective view of a nanotube-type conducting polymer prepared by electropolymerization using a porous template according to the present invention.

Hereinafter, the present invention is described in more detail referring to the drawings.

Figure 2:
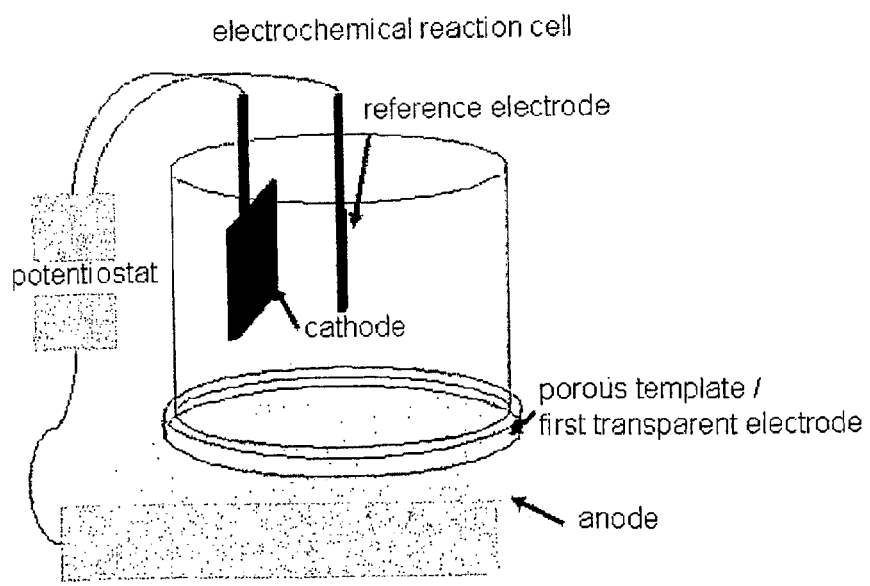
FIG. 2 is a schematic view of an electropolymerization reaction cell used for the electropolymerization method for preparing a nanotube-type conducting polymer using a porous template according to the present invention.

The present invention provides an electropolymerization method of a nanotube-type conducting polymer, which comprises a step of forming an electrochemical reaction cell comprising a first transparent working electrode on which a porous template is located, as shown in FIG. 2, and a step of electropolymerization of nanotube-type conducting polymer from the precursor of the conducting polymer in an electrolyte solution using the porous template in the electrochemical reaction cell.

To be specific, a first transparent working electrode with porous template on is placed in a sputtering chamber to form an ITO (indiumtinoxide) transparent electrode by using standard deposition technique sputtering to prepare a electrochemical cell. Preferably, the transparent electrode has a thickness ranging from 150 to 300 nm.

A counter electrode (cathode) and a reference electrode (standard electrode) are set up in the cell. Then an electrolyte solution wherein a precursor of the electrochromic conducting polymer is dissolved is filled therein, and electropolymerization is carried out under constant current condition. If the polymerization speed is controlled properly, the conducting polymer is polymerized on the inner wall of the porous template starting from the first transparent electrode. The polymerization is carried out for an appropriate time until the color of the electrochromic substance is identified by the naked eye.

The resulting conducting polymer has a tubular shape, as seen in FIG. 1, and its surface area is significantly increased. The increase in the surface area of the conducting polymer offers superior contrast and a fast response rate, and it solves the background color problem during discoloration.

Also, the present invention can lower the processing temperature to the level of room temperature, and pixelation of devices is readily available.

Preferably, the template used for the electropolymerization method for preparing a nanotube-type conducting polymer according to the present invention is selected from a white or transparent porous material. Examples include anodized metal oxide membranes, such as an anodized aluminum oxide membrane or an anodized titania membrane, or porous polymer membranes comprising polypropylene, nylon, polyester, or a block copolymer. Preferably, the porous material has a pore size (diameter) of 5 to 500 nm and a pore density of 10 to 50% by cross section.

And, preferably, the conducting polymer of the present invention offers electrochromism. To be specific, polypyrrole, polyaniline, polyazulene, polythiophene, polypyridine, polyindole, polycarbazole, polyazine, polyquinone, or a co-polymer thereof can be used. The present invention also provides a method for preparing an electrochromic device, which is composed of a first plane, which is comprising a nanotube-type conducting polymer and a first transparent electrode, a second plane comprising a second transparent electrode, and an electrolyte solution between these two planes. Preferably, the formation of electrochromic device is carried out as follows. Firstly, a conducting polymer tube, a porous template, and an ITO transparent electrode are removed from the electropolymerization cell. The first transparent electrode with porous template within which nanotube-type conducting polymer was grown is placed on a clean ITO coated glass substrate. An upper second transparent electrode, preferably, ITO coated glass is placed on top of the first electrode. Then, one end of the two planes is sealed with a sealant, such as an epoxy resin, and the electrolyte solution is injected therein, and then the other end is sealed by the same method.

When electricity is applied between the first transparent electrode and the second transparent electrode, a conducting electrochromic polymer substance in the porous material is activated, and thus its color changes. The tubular conducting polymer substance has a thickness of less than several nanometers, and a length longer than 1 μm. Accordingly, the contact region of the electrolyte solution and the conducting polymer has a large area and a small thickness, and thus very fast electrochromism is attained.

The long tube offers superior contrast during coloration and discoloration of the device. This is because the electrochromism of the conducting polymer is caused by electron injection and conduction controlled system between the electrode and the conducting polymer, differently from the conventional diffusion-controlled reaction. In addition, the thin-tube type conducting polymer membrane contacting the electrolyte solution effectively prevents confinement of electrons or ions.

Preferably, the porous material used for preparation of an electrochromic device according to the present invention is a white or semi-transparent (due to light scattering) template, and more preferably an anodized aluminum oxide membrane. Since the porous material is white or semi-transparent due to light scattering, it generates a background color and improves the contrast of the electrochromic device.

The obtained device offers the inherent color of the conducting polymer when activated by a variety of types of driving devices, and offers a transparent background color when bleached. Such a device can be pixelated and can be used along with a variety of devices, including the conventional electronic displays, through TFTs or electrical wiring at the bottom of the second transparent electrode. It can also be used for a smart window if it has a transparent background color.

Hereinafter, the present invention is described in more detail through an example. However, the following example is only for the understanding of the present invention, and the present invention is not limited thereby.

EXAMPLE

An anodized aluminum oxide membrane (AAO; Whatman) having a pore size of about 100 nm was used for the porous material. This filter membrane was put in a sputtering chamber and a transparent electrode was formed on the backplane by the usual ITO deposition method, so that the transparent electrode had a thickness of about 150 to 300 nm and the backplane pores were not completely blocked. The deposited ITO/AAO membrane was put on an ITO/glass electrode, so that the deposited ITO surface contacted the electrode. Then, an electropolymerization cylinder was pressed on the membrane to make an electropolymerization unit. A counter electrode and a reference electrode were placed in the electropolymerization unit and it was filled with an electrolyte/polymer solution. The electrolyte solution was 0.1M $LiClO_4$/acetonitrile, and 10 mM 2,3-dihydrothieno[3,4-b]-1,4dioxin or 3,4-ethylenedioxythiophene can preferably be used for the polymerization solution.

Figure 3:
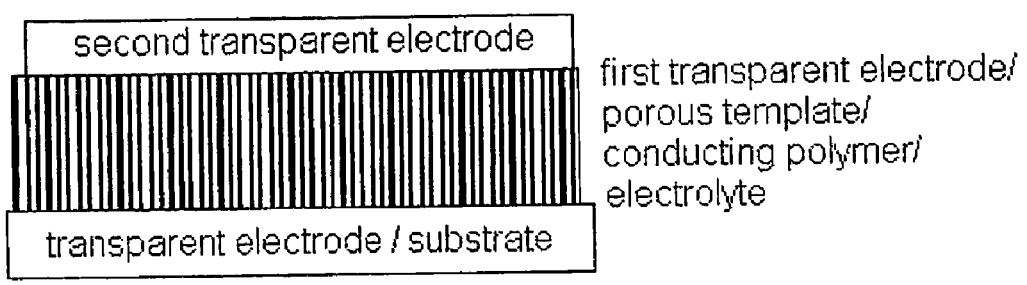
FIG. 3 is a cross-sectional view of an electrochromic device according to the preferred embodiment of the present invention.

Using a potentiostat (EG&G Princeton Applied Research Model M273), polymerization was carried out for 10 minutes in the electropolymerization unit under the constant current condition of 60 mA. As a conducting polymer called PEDOT [poly(3,4-ethylenedioxythiophene)] was polymerized, the color of the AAO membrane turned from white to deep violet. The PEDOT/MO/ITO membrane was removed from the electropolymerization unit and put on a clean ITO/glass substrate. Then, a second transparent electrode also comprising an ITO/glass substrate was placed on top of the first electrode, and the two electrodes were sealed with an epoxy resin. 0.1M $LiClO_4$/acetonitrile electrolyte solution was injected therein through the one unsealed edge and the this edge was sealed later with the same sealant to complete the device shown in FIG. 3.

When a voltage of 1 to 1.5V was applied to the prepared device, with the first transparent electrode as the anode and the second transparent electrode as the cathode, the electrochromic material was activated and its color turned to deep violet. When a reverse voltage was applied, the electrochromic material was deactivated and the color was restored. The response rate of coloration and discoloration was very fast (less than 100 ms), and there was no latent image during discoloration.

While the present invention has been described in detail with reference to the preferred embodiments, those skilled in the art will appreciate that various modifications and substitutions can be made thereto without departing from the spirit and scope of the present invention as set forth in the appended claims.

As described above, the electrochromic device of the present invention has a tubular conducting polymer, so that it offers superior contrast and a fast response rate because of its increased surface area. It leaves no latent image during discoloration, and can be prepared at room temperature. It is also advantageous in terms of pixelation.

What is claimed is:

1. A method for preparing an electrochromic device, comprising:
    preparing a first plane comprising a first transparent electrode, a porous template located on the first transparent electrode, and a nanotube conducting polymer in pores of the porous template;
    placing a second plane comprising a second transparent electrode on top of the porous template of the first plane; and
    injecting an electrolyte solution between the first transparent electrode of the first plane and the second transparent electrode of the second plane;
    wherein the first plane is prepared by a method comprising:
    forming an electrochemical reaction cell including the first transparent electrode on which the porous template is located; and
    electropolymerizing the nanotube conducting polymer from a precursor of the conducting polymer using the porous template in the electrochemical reaction cell.

2. The method according to claim 1, wherein the conducting polymer is selected from a group consisting of polypyrrole, polyaniline, polyazulene, polythiophene, polypyridine, polyindole, polycarbazole, polyazine, and polyquinone.

3. The method according to claim 1, wherein the porous template is an anodized metal oxide membrane or a polymer membrane.

4. The method according to claim 3, wherein the anodize metal oxide membrane is an anodize aluminum oxide membrane or an anodize titania membrane.

5. The method according to claim 3, wherein the polymer membrane is selected from the group consisting of polypropylene, nylon, polyester, and a block copolymer thereof.

6. The method according to claim 1, wherein the porous template has pores having a diameter of 5 to 500 nm and a pore density of 10 to 50% by cross section.

* * * * *